US006707891B1

(12) United States Patent
Guedalia

(10) Patent No.: US 6,707,891 B1
(45) Date of Patent: Mar. 16, 2004

(54) METHOD AND SYSTEM FOR VOICE ELECTRONIC MAIL

(75) Inventor: Jacob Leon Guedalia, Palo Alto, CA (US)

(73) Assignee: NMS Communications, Framingham, MA (US)

(*) Notice: Subject to any disclaimer, the term of this patent is extended or adjusted under 35 U.S.C. 154(b) by 0 days.

(21) Appl. No.: 09/220,384

(22) Filed: Dec. 28, 1998

(51) Int. Cl.[7] .............................................. H04M 1/64
(52) U.S. Cl. ............................ 379/88.17; 379/88.13; 345/333; 709/228
(58) Field of Search ........................ 379/100.01, 444, 379/88.12, 131, 88.13, 88.17, 88.25, 102.02, 67.1, 80, 88.04, 88.14, 88.16, 88.18; 709/228; 345/733

(56) References Cited

U.S. PATENT DOCUMENTS

| | | | | |
|---|---|---|---|---|
| 5,701,511 A | * | 12/1997 | Smith ...................... | 707/500.1 |
| 5,737,395 A | * | 4/1998 | Irribarren ................ | 379/100.01 |
| 5,742,773 A | * | 4/1998 | Blomfield-Brown et al. | 341/61 |
| 5,748,884 A | * | 5/1998 | Royce et al. ................. | 714/57 |
| 5,796,393 A | * | 8/1998 | MacNaughton et al. .... | 345/733 |
| 5,870,454 A | * | 2/1999 | Dahlen ................... | 379/100.01 |
| 5,945,989 A | * | 8/1999 | Freishtat et al. ......... | 379/93.02 |
| 6,023,779 A | * | 2/2000 | Fullam et al. .............. | 379/444 |
| 6,219,694 B1 | | 4/2001 | Lazaridis et al. | |
| 6,232,888 B1 | * | 5/2001 | Davis et al. ................ | 340/905 |
| 6,233,318 B1 | * | 5/2001 | Picard et al. ............ | 379/88.12 |
| 6,240,164 B1 | * | 5/2001 | Jensen ........................ | 379/131 |
| 6,269,336 B1 | * | 7/2001 | Ladd et al. .............. | 379/88.13 |
| 6,449,356 B1 | * | 9/2002 | Dezonno ............... | 379/265.01 |

OTHER PUBLICATIONS

O'Neal, Apparatus and method for channel–transparent multimedia broadcast messaging.*
Webpage: http://www.dialogic.com ("Dialogic—Making Computer Telephony Happen").
Webpage: http://www.Microsoft.com ("Microsoft Speech API 4.0").
AcuVoice reference information: http//www.acuvoice.com ("Fonix Corporation—The Human Computer Interaction Leader").
Hotmail reference information: http://www.hotmail.com.
ICQ reference information: http://www.icq.com ("ICQ—World's Largest Internet Online Communication Network").
Webpage: http://www.realaudio.com ("Real Player Information").
Webpage: http://www.lhs.com/products ("Lernout & Hauspie Product Overview").
Motorola reference information: http://www.phone.com ("Motorola—Products and Services").
Victor W. Zue "Navigating the Information Superhighway Using Spoken Language Interfaces", IEEE Expert, Oct. 1995, pp. 39–43.
Matthew Lennig, "Putting Speech Recognition to Work in the Telephone Network", IEEE Institute of Electrical and Electronic Engineers, Aug. 1990, pp. 35–41.
Frank Stajano, et al., "The Thinnest of Clients: Controlling It All Via Cellphone", Mobile Computing and Communications Review, vol. 2, No. 4, Oct. 1998.

* cited by examiner

Primary Examiner—Fan Tsang
Assistant Examiner—Gerald Gauthier
(74) Attorney, Agent, or Firm—Chapin & Huang, LLC; Barry W. Chapin

(57) ABSTRACT

A method for management of electronic mail, comprising the steps of converting an e-mail message from text to speech, receiving an input request for a selected e-mail message, reading the selected e-mail message, recording a reply to the selected e-mail message, producing an audio file, and sending the audio file as an attachment to a reply e-mail.

48 Claims, 1 Drawing Sheet

METHOD AND SYSTEM FOR VOICE ELECTRONIC MAIL

FIELD OF THE INVENTION

The present invention relates to management of electronic mail.

BACKGROUND OF THE INVENTION

Electronic mail, or e-mail, is fast becoming a dominant mode of communication. In its fundamental form, e-mail is managed by two kinds of computer software; namely, e-mail server software (referred to simply as "e-mail servers") and e-mail client software (referred to simply as "e-mail clients"). E-mail servers reside on centrally accessed computers (referred to as "server computers"), and manage incoming and outgoing e-mail for remote users who are authorized to use such server computers. E-mail servers maintain separate mail accounts for each authorized user, into which incoming mail is stored.

E-mail clients reside on remote computers (referred to as "client computers") and manage incoming and outgoing mail for designated users. E-mail clients are responsible for downloading arriving mail items from the server computer at which they are located. E-mail clients are also responsible for transmitting outgoing mail from a remote client computer to a server computer. Examples of popular e-mail clients for personal computers are Eudora®, Internet Explorer® and Netscape®.

Standard e-mail uses a protocol named Simple Mail Transport Protocol (SMTP). For use over the Internet, Multi-Purpose Internet Mail Extension (MIME) extends the format of Internet mail to allow non-US-ASCII textual messages, non-textual messages, multi-part message bodies and non-US-ASCII information in message headers. Attachments to e-mail messages are also encoded as MIME attachments.

One of the drawbacks with e-mail, however, is the need for a user to be connected to the Internet in order to receive or send his e-mail. Although Internet access is available in many homes and offices, and Internet stations are available in many public areas, being "un-wired" is still a concern for mobile users who are neither at home nor in their office. When on the road, a user often finds himself unable to access his e-mail, for a variety of reasons.

SUMMARY OF THE INVENTION

There is thus provided in accordance with a preferred embodiment of the present invention a method for management of electronic mail, including the steps of converting an e-mail message from text to speech, receiving an input request for a selected e-mail message, reading the selected e-mail message, recording a reply to the selected e-mail message, producing an audio file, and sending the audio file as an attachment to a reply e-mail.

There is also provided in accordance with a preferred embodiment of the present invention a method for management of electronic mail, including the steps of converting an e-mail message from text to speech, receiving an input request for a selected e-mail message, reading the selected e-mail message, recording a reply to the selected e-mail message, producing an audio file, storing the audio file on a computer, and sending a reply e-mail containing a link to the audio file.

There is also provided in accordance with a preferred embodiment of the present invention a system for management of electronic mail, including a text-to-speech converter converting an e-mail message from text to speech, a receiver receiving an input request for a selected e-mail message, an audio player reading the selected e-mail message, an audio recorder recording a reply to the selected e-mail message, producing an audio file, and a transmitter sending the audio file as an attachment to a reply e-mail.

There is also provided in accordance with a preferred embodiment of the present invention a system for management of electronic mail, including a text-to-speech converter converting an e-mail message from text to speech, a receiver receiving an input request for a selected e-mail message, an audio player reading the selected e-mail message, an audio recorder recording a reply to the selected e-mail message, producing an audio file, a computer storing the audio file, and a transmitter sending a reply e-mail containing a link to the audio file.

There is also provided in accordance with a preferred embodiment of the present invention a method for managing voice electronic mail including the steps of playing by a local computer an incoming audio file containing a voice message, the incoming audio file residing on a remote computer, and saving the incoming audio file as a local audio file on the local computer after the playing step.

There is also provided in accordance with a preferred embodiment of the present invention a method for management of electronic mail, including the steps of converting an e-mail message from text to speech, receiving an input request for a selected e-mail message, reading the selected e-mail message, recording a reply to the selected e-mail message, producing an audio file, sending the audio file as an attachment to a reply e-mail, and playing the audio file.

There is also provided in accordance with a preferred embodiment of the present invention a method for management of electronic mail, including the steps of converting an e-mail message from text to speech, receiving an input request for a selected e-mail message, reading the selected e-mail message, recording a reply to the selected e-mail message, producing an audio file, storing the audio file on a first computer, sending a reply e-mail containing a link to the audio file, playing the audio file, and saving the audio file.

There is also provided in accordance with a preferred embodiment of the present invention a system for managing voice electronic mail including an audio player within a local computer playing an incoming audio file containing a voice message, the incoming audio file residing on a remote computer, and a data processor saving the incoming audio file as a local audio file on the local computer, after the audio player plays the incoming audio file.

There is also provided in accordance with a preferred embodiment of the present invention a system for management of electronic mail, including a text-to-speech converter converting an e-mail message from text to speech, a receiver receiving an input request for a selected e-mail message, a first audio player reading the selected e-mail message, an audio recorder recording a reply to the selected e-mail message, producing an audio file, a transmitter sending the audio file as an attachment to a reply e-mail, and a second audio player playing the audio file.

There is also provided in accordance with a preferred embodiment of the present invention a system for management of electronic mail, including a text-to-speech converter converting an e-mail message from text to speech, a receiver receiving an input request for a selected e-mail message, a first audio player reading the selected e-mail message, an audio recorder recording a reply to the selected e-mail message, producing an audio file, a computer storing the audio file, a transmitter sending a reply e-mail containing a link to the audio file, a second audio player playing the audio file, and a data processor saving the audio file.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
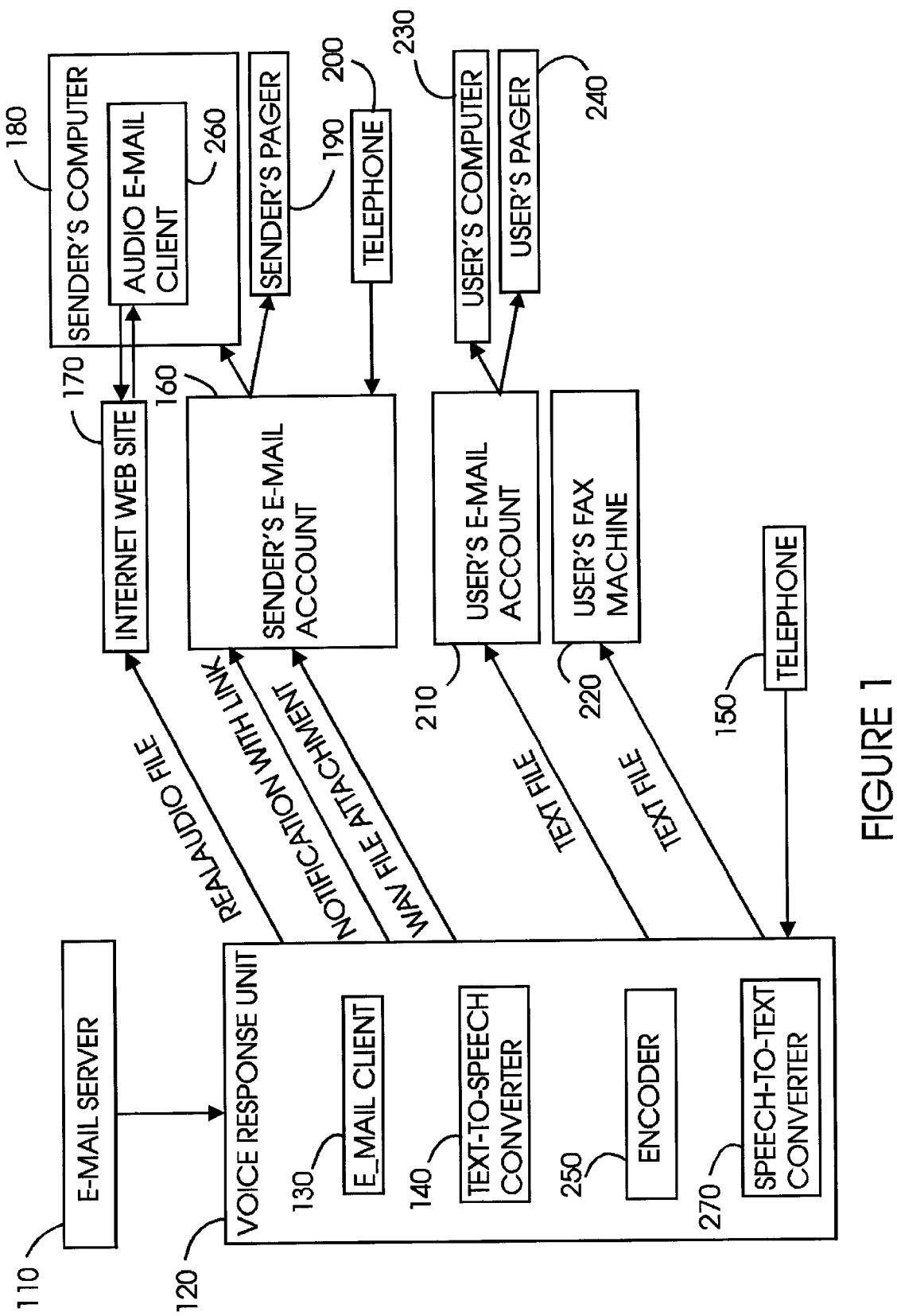
FIG. 1 is a simplified illustration of an e-mail management system in accordance with a preferred embodiment of the present invention.

The present specification describes a method and system for retrieving e-mail by dialing in from a telephone to a voice response unit. The e-mail is converted to speech and read to the user over the phone. Various selections can be made by pushing the buttons of the telephone, and the user can effectively scroll through his e-mail and choose the ones to listen to.

The present specification also describes a method and system for replying to e-mail through a telephone. The reply takes one or both of two forms: (1) a text e-mail reply, generated from the speech reply by a speech-to-text converter, and (2) an audio file that contains a recording of the speech reply therewithin. In one preferred embodiment of the present invention, the audio file is sent back to the original sender as a MIME attachment within a reply e-mail, in a standard audio format such as a WAV file. When the original sender receives the reply e-mail, he can download the WAV file to his local computer and play the file to listen to the recorded reply.

In another preferred embodiment the audio file is posted on an Internet web site in a streaming audio format such as RealAudio®, and a reply e-mail notification is sent to the original sender having an Internet link to the audio file therewithin. When the original sender receives the reply e-mail, he can click on the link to play the audio file. Streaming audio formats enable the user to play an audio file on-line, while it is being delivered, rather than have to wait until the entire audio file is downloaded. REALAUDIO is a registered trademark of Progressive Networks, Inc. Information about RealAudio files is available on the Internet at http://www.realaudio.com.

Advantages of the latter embodiment are (1) the e-mail reply is small in size, since it only contains a link to the audio file, rather than the file itself; and (2) the audio file is streamed for on-line playing. An advantage of the former embodiment is that the reply e-mail is self-contained, and the user does not have to use a web browser to listen to the voice reply.

It should be pointed out that from an ergonometric point of view, both embodiments have the advantage that e-mail messages are being replied to with speech, and the replies are being listened to rather than read. Dictating e-mail messages into a voice response unit over a telephone line, by means of a speech-to-text converter, is faster and simpler than typing a text message. For users who receive large volumes of e-mail on a daily basis, reading through e-mail is both time-consuming, and difficult on one's eyes. Many professionals spend hours daily reading and replying to e-mail messages. By listening to e-mail, rather than reading it, these professionals can work on other "vision-intensive" tasks while they are listening to their e-mail messages at the same time. This is analogous to working on a task while listening in on a conference call being played on the speaker of a telephone.

Reference is now made to FIG. 1, which is a simplified illustration of an e-mail management system in accordance with a preferred embodiment of the present invention.

To assist in understanding the present invention, a simplified example session is described.

EXAMPLE SESSION

As a simplified example of the operation of a preferred embodiment of the present invention, a mobile user dials in to a voice response unit (VRU) by means of a telephone to access his e-mail remotely. The VRU reads out a message indicating that the user has e-mail in his inbox. Each e-mail item contains a unique identifier, data fields including FROM, RE and DATE, a text body, and one or more attachments. Each e-mail message is converted from text to speech by a text-to-speech converter within the VRU.

The VRU reads out a first menu of options as follows:
1. ID:018, FROM:ANDY, RE:MEETING TOMORROW, DATE:mm/dd/yy
2. ID:004, FROM:BILL, RE:SUNDAY PICNIC, DATE:mm/dd/yy
3. ID:103, FROM:CHARLIE, RE:UPCOMING EXAM, DATE:mm/dd/yy
4. ID:075, FROM:DAN, RE:DOCTOR'S APPOINTMENT, DATE:mm/dd/yy
5. <MORE>

Option 5, "<MORE>", is used for menus that entail more information than is presented in a single list. By selecting "<MORE>", the user requests additional lists of menu items. Correspondingly, successive lists could have a "<BACK>" option for returning to previous lists.

After listening to a specific e-mail message, the user can reply to the message and/or route the message to his fax machine or to his pager. For reply purposes, the user speaks into his telephone and the VRU records the speech. The VRU then reads a second menu of options as follows:
1. POST REPLY AS A REALAUDIO FILE AND SENT NOTIFICATION WITH LINK
2. ATTACH REPLY AS A WAV FILE TO E-MAIL REPLY
3. BOTH Selecting option 1 instructs the VRU to convert the speech reply to a RealAudio file and post it on an Internet web site, and to send an e-mail reply notification containing a link to the RealAudio file. Selecting option 2 instructs the VRU to convert the speech reply to a WAV file and attach the WAV file to an e-mail reply. Selecting option 3 instructs the VRU to post the reply and also send it as an e-mail attachment. In this latter case, the receiver has a choice of whether to access the reply message from the attached WAV file or from the Internet site.

Alternatively, in a preferred embodiment of the present invention, the choice between a RealAudio file and a WAV file can be pre-programmed, thus avoiding the need for the second menu of options hereinabove. The pre-programmed choice of audio file can be customized for each reply address.

For routing purposes, the VRU reads a third menu of options as follows:
1. FAX E-MAIL TO ME
2. FAX E-MAIL ATTACHMENT TO ME
3. SEND TEXT ONLY TO MY PAGER
4. <MORE>

Selecting option 1 instructs the VRU to fax e-mail, without attachments, to the user's fax machine. Selecting option 2 instructs the VRU to fax the e-mail attachment(s) to the user's fax machine. Selecting option 3 instructs the VRU to send the text body of the e-mail to the user's pager.

Reference is now made to FIG. 1, which illustrates an e-mail management system in accordance with a preferred embodiment of the present invention. An e-mail server 110 receives e-mail designated for a specific user account. A voice response unit (VRU) 120 downloads the user's e-mail via an e-mail client 130, and converts each e-mail message from text to speech via a text-to-speech converter 140.

In a preferred embodiment of the present invention, the user dials in to the VRU from telephone 150 to retrieve his e-mail. By pressing on the telephone pad in accordance with menu options read from the VRU, the user selects e-mail messages to be read to him by the VRU. After listening to an e-mail message, the user replies into the telephone, and the VRU records the reply. The user then instructs the VRU, by means of the telephone pad, to convert the recorded reply into an audio file, such as a WAV file, and send it back to the original sender's e-mail account 160 as an attachment to a reply e-mail. Alternatively, the user can instruct the VRU to convert the recorded reply into a streaming audio format, such as a RealAudio format, and post it on an Internet web site 170. In this latter case, the VRU also sends an e-mail notification to the original sender's e-mail account 160, containing a link to the reply audio file on Internet web site 170.

From the sender's e-mail account 160, the mail can be retrieved by the sender's computer 180, by the sender's pager 190, or by the sender dialing in from telephone 200. Alternatively, the sender may also be an authorized user of a voice response unit similar to voice response unit 120, and, as such, he can dial in by telephone to retrieve his e-mail.

In a preferred embodiment of the present invention, the user can also instruct the VRU to route his incoming e-mail message by sending it as a text file to his own e-mail account 210, or to his fax machine 220. From the user's e-mail account, the mail can be retrieved by the user's computer 230 or by the user's pager 240.

In an alternative embodiment of the present invention the audio file attached to a reply e-mail can be compressed as a self-extracting compressed file. Self-extracting files contain decompressors within them. The receiver of an e-mail message with a self-extracting file attached therewithin clicks on the file, and the compressed audio file automatically decompresses itself. For example, the present invention can attach a zipped WAV file to a reply e-mail. The attachment would automatically unzip itself and generate the WAV file when a receiver clicks on the link to the attachment. In this alternative embodiment the VRU also contains an encoder 250 for compressing audio files.

Although it is the "un-wired" mobile user who typically accesses his e-mail through a telephone unit, the present invention is also advantageous to the "wired" user who accesses his e-mail through a computer connected to a network. For reasons of convenience, and other reasons as well, a user with a computer may nevertheless prefer to reply to e-mail messages and send new e-mail messages using speech rather than text.

The present invention also provides an audio e-mail client that manages incoming and outgoing audio messages. It enables a user to dictate a voice e-mail message by speaking into a microphone connected to his computer, and convert the speech into an audio file. The audio file can then be either (1) sent as an attachment to a standard e-mail message, or (2) posted on an Internet web site. In the latter case an e-mail notification message with a link to the audio file is sent. It can thus be appreciated that the present invention provides telephone-like capability to a computer user.

The audio e-mail client of the present invention enables a user to save an audio file that is in a streaming audio format on his local computer. This feature is not available in standard RealAudio players. Such players are used for listening to live broadcasts over the Internet, such as newscasts, and as such, are typically used to play an audio file once. The present invention introduces a novel use of streaming audio files; namely, for voice e-mail messages, and in this context it is important to be able to save the voice messages for future reference.

In a preferred embodiment, the audio e-mail client of the present invention provides a mail archive for voice messages that is structured hierarchically in files and directories, as is common today for text e-mail messages. When an incoming voice e-mail message is saved, the user can direct it to a specific directory or sub-directory, for cataloging and indexing purposes. Moreover the incoming voice e-mail message can be saved in a variety of formats, such as RealAudio, WAV or compressed WAV.

Referring back to FIG. 1, in a preferred embodiment of the present invention the sender may use such an audio e-mail client 260 to play the RealAudio file posted at Internet web site 170, and also save the file on the sender's computer 180.

In a preferred embodiment, the audio e-mail client of the present invention also carries out remote functions by posting voice e-mail messages on Internet web site 170. Specifically, a user can post voice e-mail messages on Internet web site for retrieval by another person, or for purposes of archiving his own voice e-mail. Audio e-mail client 260 has the capability to manage hard disk space on remote computers, by using an appropriate protocol for uploading and storing RealAudio and other audio files at Internet web site 170. This is indicated in FIG. 1 by two directional arrows between Internet web site 170 and audio e-mail client 260.

In a preferred embodiment of the present invention, Internet web site 170 resides in a server computer (not shown) that is part of an overall electronic mail management system. The overall management system also includes VRU 120 and, optionally, e-mail server 110. The protocol for uploading and storing files on Internet web site 170 may be proprietary, and, if so, audio e-mail client 260 sends files and instructions to the server computer in accordance with such proprietary protocol.

As mentioned hereinabove, the present invention provides a capability for producing text e-mail messages from speech. To this end, VRU 120 also contains a speech-to-text converter 270, for producing a text message from dictated speech into telephone 150.

The present invention is also useful within a "buddy system." Such a system is based upon a "buddy list," which is a list of friends, or members, who wish to be notified when any members of the list are on-line. An example of such a system is the Mirabilis ICQ ("I seek you") system for notifying members when a member of the list is connected to the Internet. Reference information on the ICQ system is available on the Internet at http://www.icq.com. Within the context of the present invention, VRU 120 can be programmed to notify members of a "buddy list" whenever a user who is one of the members dials in to his VRU. Upon notification the members are alerted that the user is currently dialed in to his VRU, and, as such, can be contacted therefrom.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for management of electronic mail, in a computerized device comprising the steps of:
    receiving an e-mail message at a Voice Response Unit (VRU);
    converting said e-mail message from text-to-speech;
    receiving an input request for said e-mail message;
    reading said e-mail message;
    recording a reply to said e-mail in a computerized device message producing a reply audio file;
    posting said reply audio file on a web site in a streaming audio format; and
    using said voice response unit to send a reply e-mail containing a link to said reply audio file.

2. The method of claim 1 wherein said reply audio file is a WAV file.

3. The method of claim 1 wherein said reply audio file is a compressed WAV file.

4. The method of claim 1 and also including the step of downloading an e-mail message from an e-mail server.

5. The method of claim 1 and also including said step of forwarding the selected e-mail message to a pager.

6. The method of claim 1 and also including the step of forwarding said selected e-mail message to a fax machine.

7. A method for management of electronic mail, comprising the steps of:
    receiving an e-mail message at a Voice Response Unit (VRU);
    converting said e-mail message from text-to-speech;
    receiving an input request for said e-mail message;
    reading said e-mail message;
    recording a reply to said selected e-mail message, producing a reply audio file;
    posting said reply audio file on a web site in a streaming audio format; and
    sending a reply e-mail containing a link to said reply audio file.

8. The method of claim 7 wherein said reply audio file is a RealAudio file.

9. The method of claim 7 and also including the step of downloading an e-mail message from an e-mail server.

10. The method of claim 7 and also including the step of forwarding said selected e-mail message to a pager.

11. The method of claim 7 and also including the step of forwarding said selected e-mail message to a fax machine.

12. A system for management of electronic mail, comprising:
    a voice response unit (VRU) operative to send links by e-mail, said voice response unit comprising:
        a text-to-speech converter converting an e-mail message from text to speech;
        a receiver receiving an input request for said e-mail message;
        an audio player reading said e-mail message;
        an audio recorder recording a reply to said e-mail message, producing a reply audio file;
        a transmitter posting said reply audio file on a web site in a streaming audio format; and
        an electronic message sender operative to send an e-mail message containing a link to said reply audio file.

13. The system of claim 12 wherein said reply audio file is a WAV file.

14. The system of claim 13 wherein said reply audio file is a compressed WAV file.

15. The system of claim 12 and also including a downloader downloading an e-mail message from an e-mail server.

16. The system of claim 12 and also including a mail forwarder forwarding said selected e-mail message to a pager.

17. The system of claim 12 and also including a mail forwarder forwarding said selected e-mail message to a fax machine.

18. A system for management of electronic mail in a computerized device, comprising:
    a voice response unit (VRU) receiving an e-mail message;
    a text-to-speech converter converting an e-mail message from text to speech;
    a receiver receiving an input request for said e-mail message;
    an audio player reading said e-mail message;
    an audio recorder recording a reply to said e-mail message, producing a reply audio file; and
    a transmitter posting said reply audio file on a web site in a streaming audio format
    wherein the voice response unit is operative to send an e-mail message containing a link to said reply audio file.

19. The system of claim 18 wherein said reply audio file is a RealAudio file.

20. The system of claim 18 and also including a downloader downloading an e-mail message from an e-mail server.

21. The system of claim 18 and also including a mail forwarder forwarding said selected e-mail message to a pager.

22. The system of claim 18 and also including a mail forwarder forwarding said selected e-mail message to a fax machine.

23. A method for management of electronic mail in a computerized device, comprising the steps of:
    receiving an e-mail message at a Voice Response Unit (VRU);
    converting said e-mail message from text to speech;
    receiving an input request for said selected e-mail message;
    reading said e-mail message;
    recording a reply to said selected e-mail message, producing a reply audio file;
    posting said reply audio file on a web site in a streaming audio format;
    sending a reply e-mail containing a link to said reply audio file; and
    playing said reply audio file.

24. The method of claim 23 wherein said reply audio file is a WAV file.

25. The method of claim 23 wherein said reply audio file is a compressed WAV file.

26. The method of claim 25 and wherein said playing step includes the step of decompressing said reply audio file.

27. A method for management of electronic mail in a computerized device, comprising the steps of:
- receiving an e-mail message at a Voice Response Unit (VRU);
- converting said e-mail message from text to speech;
- receiving an input request for said e-mail message;
- reading said e-mail message;
- recording a reply to said e-mail message, producing a reply audio file;
- employing a first computer for posting said reply audio file on a web site in a streaming audio format;
- sending a reply e-mail containing a link to said reply audio file;
- playing said reply audio file; and
- saving said reply audio file.

28. The method of claim 27 wherein said reply audio file is a RealAudio file.

29. The method of claim 27 and wherein said saving step includes the step of converting said reply audio file to a designated file format.

30. The method of claim 29 wherein said designated file format is a WAV format.

31. The method of claim 29 wherein said designated file format is a compressed WAV format.

32. A system for management of electronic mail, comprising:
- a voice response unit (VRU) receiving an e-mail message;
- a text-to-speech converter converting said e-mail message from text to speech;
- a receiver receiving an input request for said e-mail message;
- a first audio player reading said e-mail message;
- an audio recorder recording a reply to said e-mail message, producing a reply audio file;
- a transmitter posting said reply audio file on a web site in a streaming audio format; and
- a second audio player playing said reply audio file.

33. The system of claim 32 wherein said reply audio file is a WAV file.

34. The system of claim 32 wherein said reply audio file is a compressed WAV file.

35. The system of claim 34 and also comprising a decompressor decompressing said reply audio file.

36. A system for management of electronic mail, comprising:
- a voice response unit (VRU) receiving an e-mail message;
- a text-to-speech converter converting an e-mail message from text to speech;
- a receiver receiving an input request for said e-mail message;
- a first audio player reading said e-mail message;
- an audio recorder recording a reply to said e-mail message, producing a reply audio file;
- a computer posting said reply audio file on a web site in a streaming audio format;
- a transmitter sending a reply e-mail containing a link to said reply audio file;
- a second audio player playing said reply audio file; and
- a data processor saving said reply audio file.

37. The system of claim 36 wherein said reply audio file is a RealAudio file.

38. The system of claim 36 and wherein said data processor converts said reply audio file to a designated file format.

39. The system of claim 38 wherein said designated file format is a WAV format.

40. The system of claim 38 wherein said designated file format is a compressed WAV format.

41. A method according to claim 1 and wherein said streaming audio format is RealAudio R.

42. A method according to claim 7 and wherein said streaming audio format is RealAudio R.

43. A system according to claim 12 and wherein said streaming audio format is RealAudio R.

44. A system according to claim 18 and wherein said streaming audio format is RealAudio R.

45. A method according to claim 23 and wherein said streaming audio format is RealAudio R.

46. A method according to claim 27 and wherein said streaming audio format is RealAudio R.

47. A system according to claim 32 and wherein said streaming audio format is RealAudio R.

48. A system according to claim 36 and wherein said streaming audio format is RealAudio R.

* * * * *